United States Patent
Barger et al.

(10) Patent No.: US 10,935,115 B2
(45) Date of Patent: Mar. 2, 2021

(54) LINEAR ACTUATOR WITH TESTABLE CONE NO-BACK AND TORQUE LIMITER

(71) Applicant: Hamilton Sundstrand Corporation, Charlotte, NC (US)

(72) Inventors: Victor Barger, Lake in the Hills, IL (US); James M. Regan, Rockford, IL (US); Joseph M. Bielefeldt, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 115 days.

(21) Appl. No.: 16/105,576

(22) Filed: Aug. 20, 2018

(65) Prior Publication Data
US 2020/0056688 A1    Feb. 20, 2020

(51) Int. Cl.
*F16D 7/02*    (2006.01)
*F16D 49/20*    (2006.01)
(Continued)

(52) U.S. Cl.
CPC ......... *F16H 25/2021* (2013.01); *F16D 7/028* (2013.01); *F16D 49/20* (2013.01); *F16D 65/28* (2013.01); *F16H 25/2454* (2013.01); *F16H 57/01* (2013.01); *G01M 13/021* (2013.01); *G01M 13/022* (2013.01); *B64C 13/32* (2013.01); *F16D 2121/14* (2013.01); *F16H 2057/014* (2013.01)

(58) Field of Classification Search
CPC .. F16D 59/02; F16D 2065/022; F16D 65/028; F16D 7/028; F16D 49/20; F16D 2121/14; F16D 59/00; F16D 2125/36; F16D 2125/52; F16D 63/008; B64C 13/28–32; F16H 25/2021; F16H 25/2454; F16H 57/01; F16H 2057/014
See application file for complete search history.

(56) References Cited

U.S. PATENT DOCUMENTS 4,176,733 A * 12/1979 Twickler .................. F16D 7/08
                                                                 188/134
8,511,441 B2    8/2013   Lang et al.
(Continued)

FOREIGN PATENT DOCUMENTS

EP          2306041 A1    4/2011

OTHER PUBLICATIONS

European Search Report for European App No. 19191255.9-1012, dated Feb. 17, 2020, 5 pages.

*Primary Examiner* — Ernesto A Suarez
*Assistant Examiner* — Lillian T Nguyen
(74) *Attorney, Agent, or Firm* — Cantor Colburn LLP

(57) ABSTRACT

A cone brake no-back includes an input no-back disk, an output no-back disk; and a no-back ball ramp mechanism operably connected to the input no-back disk and the output no back disk. An input no-back cone is operably connected to and supportive of the input no-back disk. The input no-back cone is axially loaded by an input no-back spring. An output no-back cone is operably connected to and supportive of the output no-back disk. The output no-back cone is axially loaded by an output no-back spring. A no-back input shaft is operably connected to the input no-back disk and the output no back disk, and a no-back output shaft is operably connected to the output no back disk.

13 Claims, 4 Drawing Sheets

(51) Int. Cl.
    *F16D 65/28*     (2006.01)
    *F16H 25/20*     (2006.01)
    *F16H 25/24*     (2006.01)
    *F16H 57/01*     (2012.01)
    *G01M 13/021*     (2019.01)
    *G01M 13/022*     (2019.01)
    *B64C 13/32*     (2006.01)
    *F16D 121/14*     (2012.01)

(56) References Cited

U.S. PATENT DOCUMENTS

| | | |
|---|---|---|
| 8,636,118 B2 | 1/2014 | Iraschko et al. |
| 8,684,146 B2 | 4/2014 | Iraschko |
| 8,739,945 B2 | 6/2014 | Iraschko et al. |
| 9,255,632 B2 | 2/2016 | Finney |
| 9,527,580 B2 | 12/2016 | Lang et al. |
| 9,616,990 B2 | 4/2017 | Barger |
| 9,651,126 B2 | 5/2017 | Lang et al. |
| 2006/0163026 A1 | 7/2006 | Lang |
| 2009/0090204 A1* | 4/2009 | Jones ................ F16H 25/2454 74/89.39 |
| 2011/0240421 A1 | 10/2011 | Lang et al. |
| 2012/0080283 A1 | 4/2012 | Lang et al. |
| 2013/0313067 A1* | 11/2013 | Finney ................ F16D 55/02 192/223.2 |
| 2014/0138482 A1 | 5/2014 | Lang et al. |
| 2016/0016653 A1 | 1/2016 | Barger |
| 2016/0083080 A1 | 3/2016 | Lang et al. |
| 2017/0081017 A1 | 3/2017 | Barger |

\* cited by examiner

LINEAR ACTUATOR WITH TESTABLE CONE NO-BACK AND TORQUE LIMITER

BACKGROUND

Exemplary embodiments pertain to the art of actuation systems, and more particularly to linear actuator systems.

Linear actuator applications convert high speed/low torque inputs from power drive units or direct drive motors into low speed/high linear output force displacements via gear train systems and linear power screw mechanisms such as ball screws.

No-backs are typically used with aircraft actuators, which may be used to displace an aircraft surface, such as a flap, a leading edge, or a trailing edge of a wing, or other control surface. Depending on the aircraft surface, multiple actuators may be required. In the case of a system of aerodynamic surfaces, multiple actuators may be positioned at opposite sides of an aircraft, and are typically driven by an input, which is, for example, a drive line torque shaft. In the event of failure or disconnect of the drive line torque shaft, for example, a no-back will prevent an associated aircraft surface from being displaced from a selected position.

In addition, flap applications may incorporate torque limiter mechanisms to limit the maximum output force the actuator can generate thereby protecting adjacent aircraft structures from overload conditions.

BRIEF DESCRIPTION

In one embodiment, a cone brake no-back includes an input no-back disk, an output no-back disk; and a no-back ball ramp mechanism operably connected to the input no-back disk and the output no back disk. An input no-back cone is operably connected to and supportive of the input no-back disk. The input no-back cone is axially loaded by an input no-back spring. An output no-back cone is operably connected to and supportive of the output no-back disk. The output no-back cone is axially loaded by an output no-back spring. A no-back input shaft is operably connected to the input no-back disk and the output no back disk, and a no-back output shaft is operably connected to the output no back disk.

Additionally or alternatively, in this or other embodiments an input no-back disk lining is configured to reduce friction between the input no-back disk and the input no-back cone.

Additionally or alternatively, in this or other embodiments the input no-back disk lining is formed from an aramid or composite material.

Additionally or alternatively, in this or other embodiments the no-back output shaft is a hollow torque shaft.

Additionally or alternatively, in this or other embodiments the no-back input shaft is coaxial with and is located radially inside of the no-back output shaft.

Additionally or alternatively, in this or other embodiments an axial travel of the input no-back cone due to the input no-back spring is limited by a mechanical stop.

In another embodiment, a no back system includes a cone brake no-back, a no-back input shaft operably connected to the cone brake no-back, a no-back output shaft operably connected to the cone brake no-back, and a cone torque limiter operably connected to the no-back output shaft. The cone torque limiter includes a cone torque limiter reaction ball ramp rotatably driven by the no-back output shaft, a torque limiter cone brake, a cone torque limiter ball ramp mechanism located between the cone torque limiter reaction ball ramp and the torque limiter cone brake and engaged therewith. A torque limiter reaction cone is located such that when a surface jam or an overtorque load is applied via the drive gear the torque limiter cone brake engages the torque limiter reaction cone for transmission of the load to structural ground.

Additionally or alternatively, in this or other embodiments the cone torque limiter reaction ball ramp is supported by a thrust bearing set.

Additionally or alternatively, in this or other embodiments the torque limiter cone brake is axially preloaded by a torque limiter preload spring.

Additionally or alternatively, in this or other embodiments the cone brake no-back includes an input no-back disk, an output no-back disk, and a no-back ball ramp mechanism operably connected to the input no-back disk and the output no back disk. An input no-back cone is operably connected to and supportive of the input no-back disk. The input no-back cone is axially loaded by an input no-back spring. An output no-back cone is operably connected to and supportive of the output no-back disk. The output no-back cone is axially loaded by an output no-back spring. The no-back input shaft is operably connected to the input no-back disk and the output no back disk, and the no-back output shaft is operably connected to the output no back disk.

Additionally or alternatively, in this or other embodiments an input no-back disk lining is applied to the input no-back disk and the input no-back cone.

Additionally or alternatively, in this or other embodiments the input no-back disk lining is formed from an aramid or composite material containing aramid.

Additionally or alternatively, in this or other embodiments the no-back output shaft is a hollow torque shaft.

Additionally or alternatively, in this or other embodiments the no-back input shaft is coaxial with and located radially inside of the no-back output shaft.

Additionally or alternatively, in this or other embodiments an axial travel of the input no-back cone due to the input no-back spring is limited by a mechanical stop.

Additionally or alternatively, in this or other embodiments a no-back test mechanism is coupled to an output drive gear of the no-back system. The no-back test mechanism includes a test pinion gear selectably engagable with the output drive gear, and a test power source operably connected to the test pinion gear and configured to apply a back drive load to the cone brake no-back via the output drive gear when the test pinion gear is engaged with the output drive gear.

Additionally or alternatively, in this or other embodiments a test spring biases the test pinion gear out of engagement with the output drive gear.

In yet another embodiment, a no-back system includes a cone brake no-back driven by a no-back input shaft, a cone torque limiter operably connected to the cone brake no-back via a no-back output shaft, an output drive gear operably connected to the cone torque limiter, a linear power screw operably connected to and driven by the output drive gear, and a no-back test mechanism selectably engagable with the output drive gear to test the cone brake no-back.

Additionally or alternatively, in this or other embodiments the cone brake no-back includes an input no-back disk, an output no-back disk, a no-back ball ramp mechanism operably connected to the input no-back disk and the output no back disk, and an input no-back cone operably connected to and supportive of the input no-back disk. The input no-back cone is axially loaded by an input no-back spring. An output no-back cone is operably connected to and supportive of the output no-back disk, the output no-back cone axially loaded by an output no-back spring. The no-back input shaft is operably connected to the input no-back disk and the output no back disk, and the no-back output shaft is operably connected to the output no back disk.

Additionally or alternatively, in this or other embodiments the cone torque limiter includes a cone torque limiter reaction ball ramp rotatably driven by the no-back output shaft, a torque limiter cone brake, a cone torque limiter ball ramp mechanism located between the cone torque limiter reaction ball ramp and the torque limiter cone brake and engaged therewith, and a torque limiter reaction cone located such that when a surface jam or an overtorque load is applied via the drive gear the torque limiter cone brake engages the torque limiter reaction cone for transmission of the load to structural ground.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
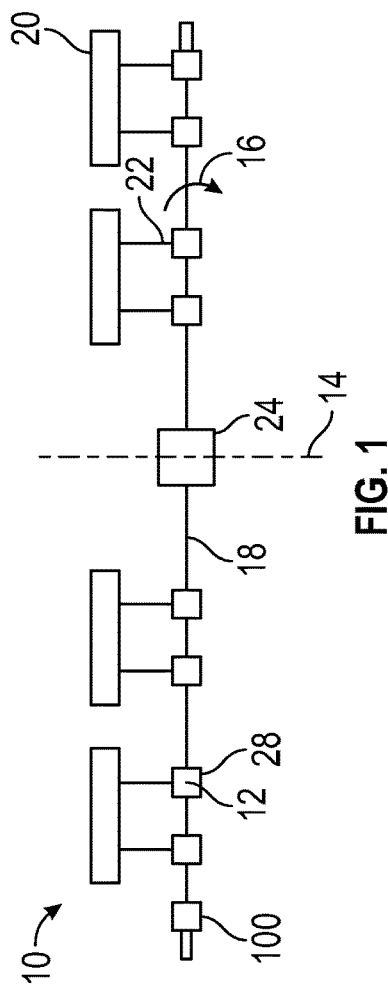
FIG. 1 is a schematic illustration of an embodiment of an actuation system of an aircraft.

Referring to FIG. 1, a schematic illustration of an example of an aircraft actuation system 10 is shown. Multiple actuators 12 may be arranged about an aircraft centerline 14. Each of the actuators 12 are driven by an input, shown generally as actuator input 16 from an actuator drive shaft 18, and may be coupled to a load 20 by way of a linkage mechanism 22. The actuator drive shaft 18 is driven by a power drive unit (PDU) 24. The load 20 may be, for example, a movable aircraft surface, such as a flap, leading edge or trailing edge of a wing. The load 20 generally imparts a torque, or load, on respective actuators 12. The load imparted on the actuators 12 may aid or oppose the torque generated by the input from the actuator drive shaft 18. In a system without no-backs 28, an input insufficient to oppose the load 20 (e.g. if the input shaft or the PDU were to fail) may cause the actuator 12 to back-drive, thus causing the load 20 to displace from a selected position. Thus, each of the actuators 12 includes a no-back 28 to prevent the back-drive of the actuators 12 and to prevent unwanted displacement of the load 20. In this regard, no-backs 28 aid in maintaining aircraft control. The actuation system 10 may further include position sensors 100 at either end of the actuator drive shaft 18 to monitor system position.

Figure 2:
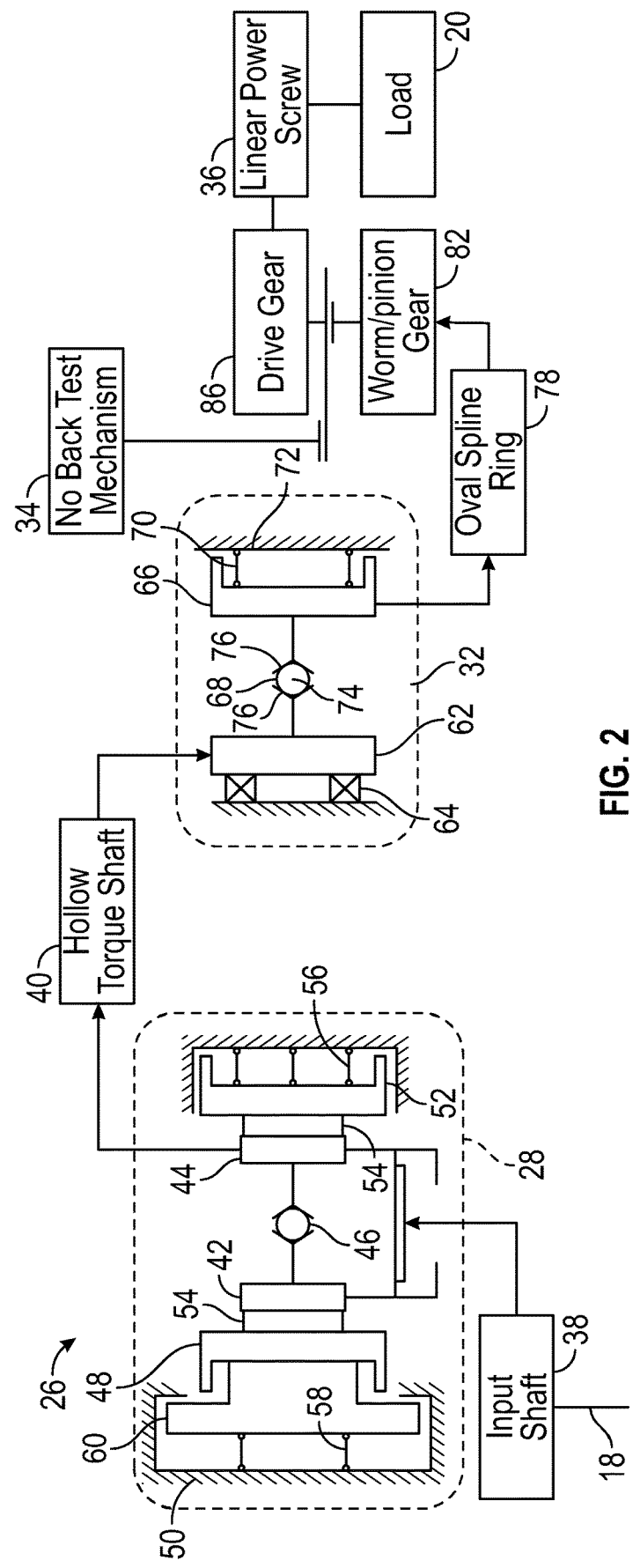
FIG. 2 is a schematic illustration of an embodiment of a no-back and torque limiter system of an actuator.
Figure 3:
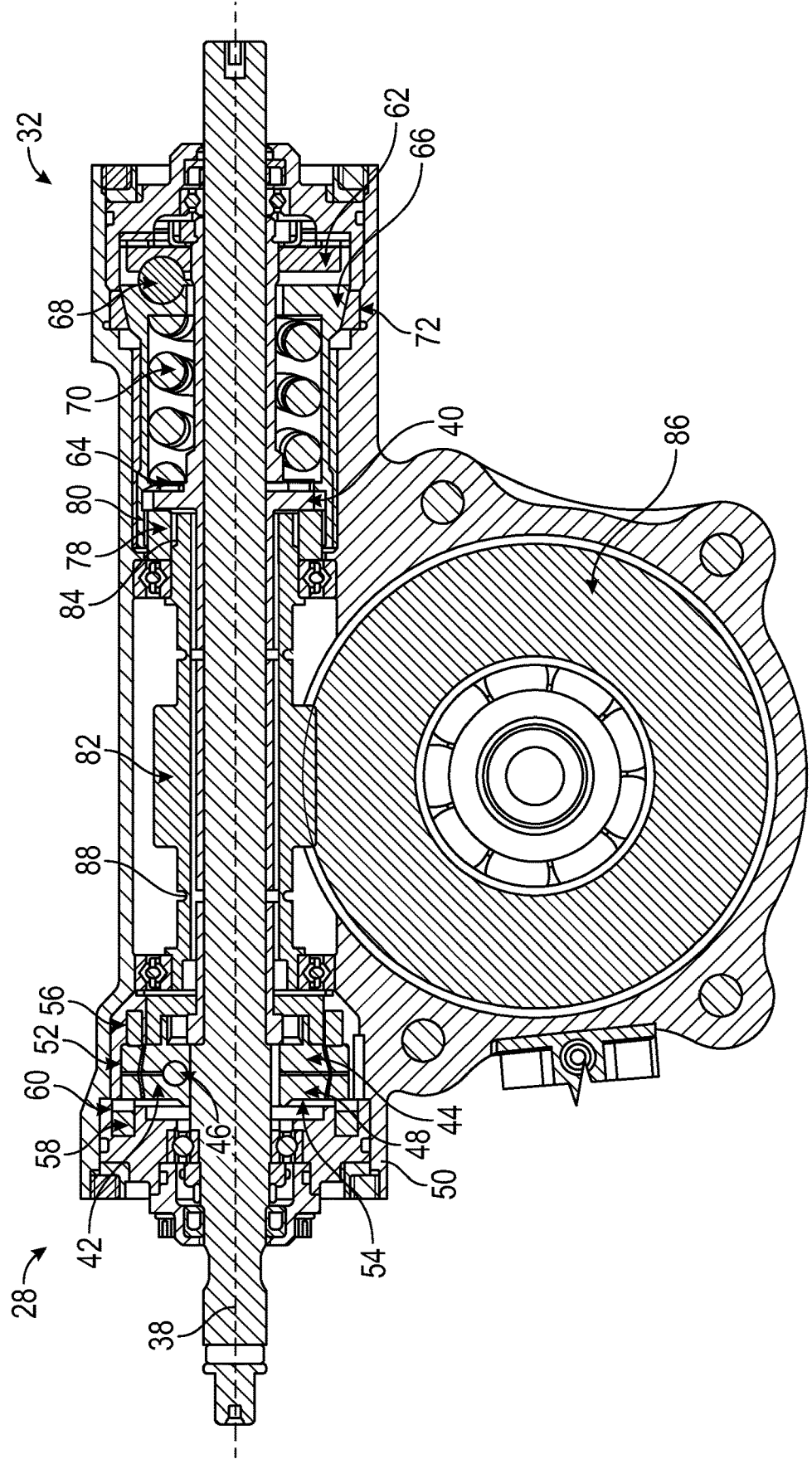
FIG. 3 is a cross-sectional view of an embodiment of a no-back and torque limiter system.

Illustrated in FIGS. 2 and 3 is an embodiment of an actuator system 26. The actuator system 26 of the embodiments illustrated includes a cone brake no-back 28 operably connected to the actuator drive shaft 18. The actuator system 26 further includes a cone torque limiter 32 and a no-back test mechanism 34. The cone brake no-back 28 and cone torque limiter 32 are connected by a hollow torque shaft 40. The actuator system 26 is operably connected to the load 20 via a linear power screw 36. While in the embodiment illustrated in FIGS. 2 and 3, the actuator system 26 includes both the cone brake no-back 28 and the cone torque limiter 32, it is to be appreciated that in other embodiments one of the cone brake no-back 28 or the cone torque limiter 32 may be omitted.

As shown in the schematic view of FIG. 2 and the cross-sectional view of FIG. 3, the actuator system 26 receives torque at a no-back input shaft 38 via the drive line 18, which may rotate in forward and reverse directions. The actuator drive shaft 18 drives rotation of the no-back input shaft 38 which, in turn, drives rotation of a hollow torque shaft 40, transferring torque to the cone torque limiter 32. In some embodiments, the no-back input shaft 38 is coaxial with and disposed radially inside of the hollow torque shaft 40. The cone brake no-back 28 includes an input no-back disk 42 and an output no-back disk 44 both engaged with a no-back ball ramp mechanism 46 located between the input no-back disk 42 and the output no-back disk 44. Both of the input no-back disk 42 and the output no-back disk 44 are rotatably connectible and driveable by the no-back input shaft 38, while the output no-back disk 44 is also connected to the hollow torque shaft 40.

The input no-back disk 42 is supported by an input no-back cone 48, rotatably fixed in a no-back housing 50. Similarly, the output no-back disk 44 is supported by an output no-back cone 52 which is rotatably fixed in the housing 50. The input no-back disk 42 rotates relative to the input no-back cone 48, and similarly the output no-back disk 44 rotates relative to the output no-back cone 52. In some embodiments, a lining 54 is disposed between the input no-back disk 42 and the input no-back cone 48, and/or between the output no-back disk 44 and the output no-back cone 52. The lining 54 is formed from, for example, aramid or composite material containing aramid to reduce friction and aid in wear mitigation.

The cone brake no-back 28 includes a two-stage spring loading system. As best shown in the schematic view of FIG. 2, an output no-back spring 56 is disposed between the output no-back cone 52 and the housing 50, and provides an axial load to the output no-back cone 52. The axial load is ultimately reacted by the input no-back cone 48. The input no-back cone 48 is axially loaded in an opposite direction relative to the axial load of the output no-back cone 52 by a input no-back spring 58 disposed between the input no-back cone 48 and the housing 50. Travel of the input no-back cone 48 due to the axial load is limited, however, by a mechanical axial stop 60 of the input no-back cone 48, which collides with the housing 50 under the axial load. The output no-back spring 56 defines a constant drag load the cone brake no-back 28 generates during a torque transmission through the input section of the cone brake no-back 28 such that the no-back ball ramp mechanism 46 is not active. In some embodiments, the output no-back spring 56 has a lower spring constant than the input no-back spring 58. The mechanical axial stop 60 sets a preload of the input no-back spring 58 and prevents the input no-back spring 58 from loading the output no-back cone 52 when the no-back ball ramp mechanism 46 is not active. In other embodiments, a relative spring rate between the output no-back spring 56 and the input no-back spring 58 is otherwise selected to achieve a desired system performance.

When a magnitude of torque is applied to the output no-back disk 44 via the hollow torque shaft 40 such that the no-back ball ramp mechanism 46 is activated, the output no-back cone 52 compresses the output no-back spring 56, in some embodiments, until the output no-back cone 52 bottoms out on the housing 50. Once the output no-back cone 52 bottoms out on the housing 50, the input no-back spring 58 provides an opposing force equal to the axial force generated by the no-back ball ramp mechanism 46. The increase in axial force combined with the gain of the no-back cones 48, 52 will prevent rotation of the no-back 28, thus locking the actuator drive shaft 18 upon a back driving load applied.

As stated above, the cone brake no-back 28 is connected to a cone torque limiter 32 via the hollow torque shaft 40. The hollow torque shaft 40 is connected to a cone torque limiter reaction ball ramp 62 of the cone torque limiter 32 and drives rotation thereof. The cone torque limiter reaction ball ramp 62 is axially supported at the housing 50 by a thrust bearing set 64. The cone torque limiter reaction ball ramp 62 is connected to a torque limiter cone brake 66 via a cone torque limiter ball ramp mechanism 68. The torque limiter cone brake 66 is preloaded at a torque limiter reaction cone 72 by a torque limiter preload spring 70, which, as best shown in FIG. 3, is supported by the hollow torque shaft 40.

The torque limiter preload spring 70 generates torque transmission through the cone torque limiter ball ramp mechanism 68 through the operating range of the actuator 12. When an overload torque is transmitted into the cone torque limiter 32, balls 74 travel up ramps 76 of the cone torque limiter ball ramp mechanism 68, translating the torque limiter cone brake 66 axially until the torque limiter cone brake 66 engages with and is locked to the torque limiter reaction cone 72, which transmits the overload torque to structural ground. This increase in axial force combined with the gain of the torque limiter will prevent rotation of the output thus locking the actuator drive shaft 18 and preventing an increase in actuator output load to the surface regardless of the amount of load that is applied to the input of the actuator.

A dual spline ring 78 is meshed at, for example, an outer radial surface 80 with the torque limiter cone brake 66 such that output torque from the torque limiter cone brake 66 is transferred to the dual spline ring 78. The dual spline ring 78 is also meshed with a worm gear 82 at, for example, an inner radial surface 84. The worm gear 82 is coaxial with the hollow torque shaft 40, and is located radially outboard of the hollow torque shaft 40. The worm gear 82 is in turn operably connected to a drive gear 86, which drives the linear power screw 36 connected to the load 20. While a worm gear 82 is described herein, it is to be appreciated that other configurations may be utilized to transfer torque between the dual spline ring 78 and the drive gear 86, for example a bevel gear, pinion gear or the like. Further, the worm gear 82 includes bi-directional lubrication orifices 88 which allow for lubrication flow to and from a worm inner surface. In some embodiments, the linear power screw 86 is a ball screw assembly, while in other embodiments the linear power screw 86 may be an acme screw assembly or a roller screw assembly.

Figure 4:
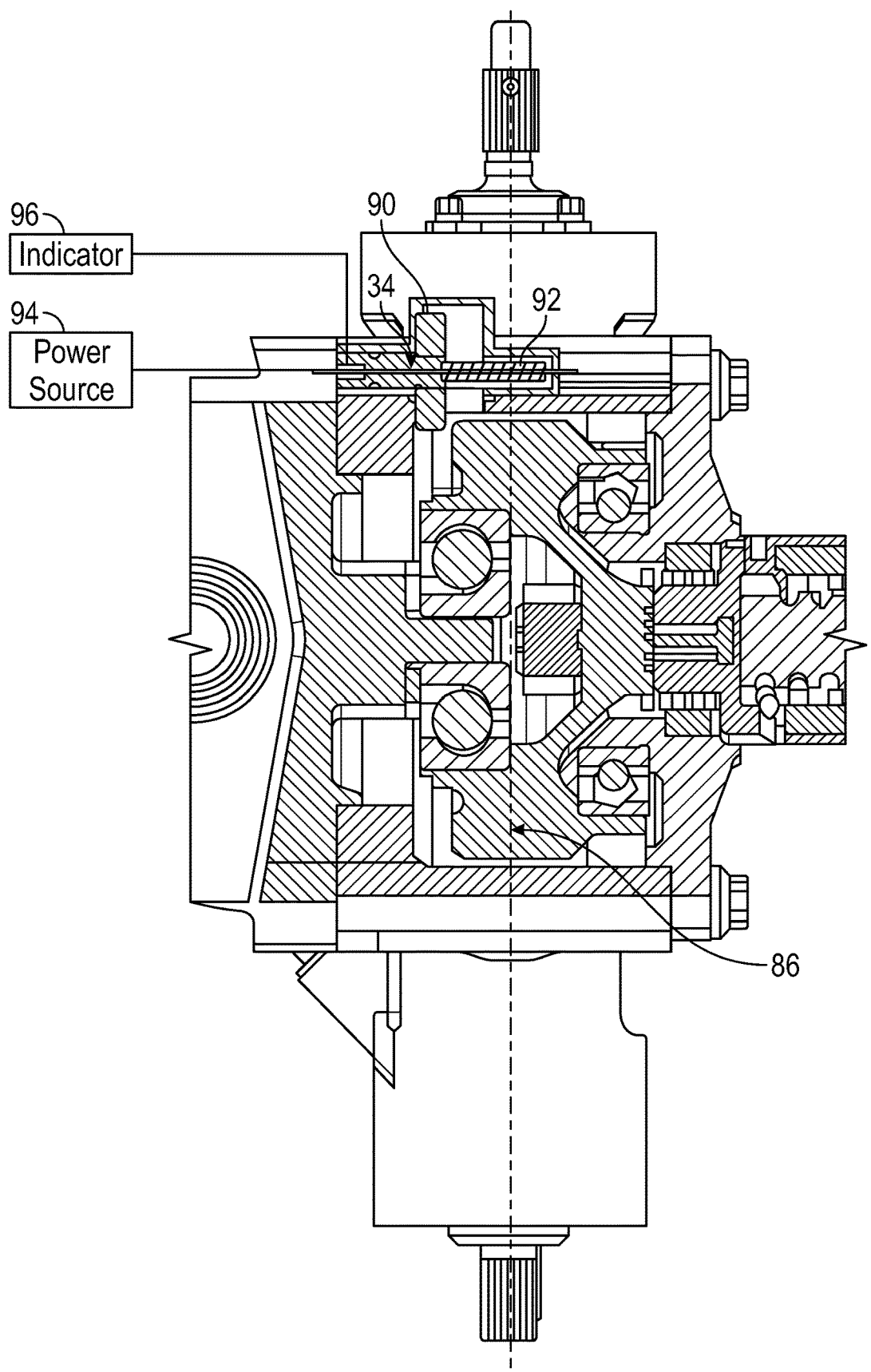
FIG. 4 is a cross-sectional view of an embodiment of a no-back test mechanism of a no-back system.
Figure 5:
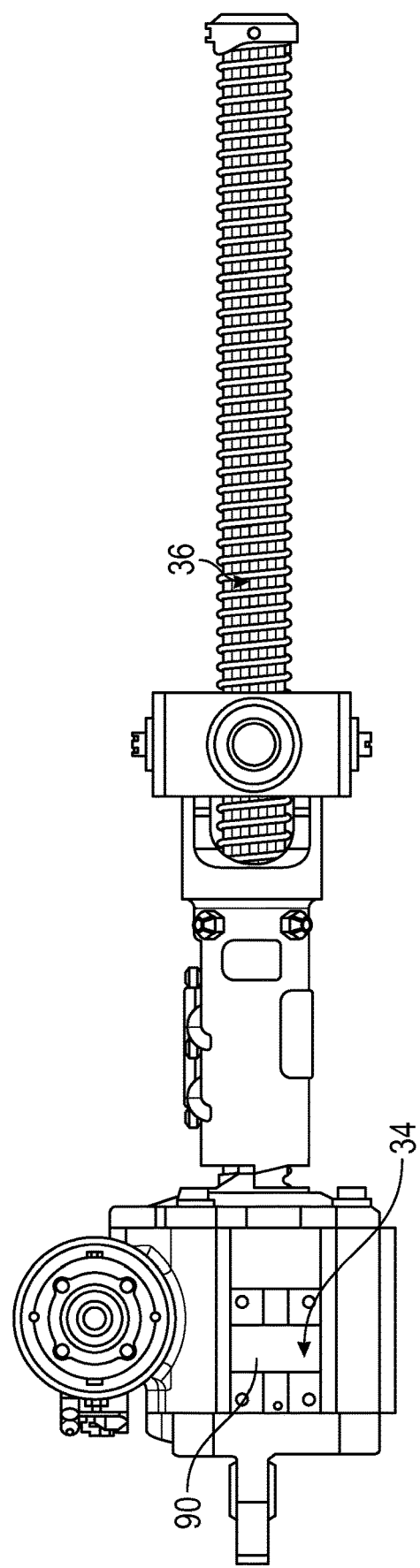
FIG. 5 is another cross-sectional view of an embodiment of a no-back test mechanism of a no-back system.

The no-back test mechanism 34 is located and configured for selective engagement with the drive gear 86 to input a reverse torque into the cone brake no-back 28 and test the function of the cone brake no-back 28. Referring now to FIGS. 4 and 5, the no-back test mechanism 34 includes a test pinion gear 90, which is axially biased by a test spring 92 to be out of mesh with the drive gear 86 until the bias of the test spring 92 is overcome. The test pinion gear 90 is operably connected to a test power source 94, which provides rotational torque to the test pinion gear 90 for a test of the cone brake no-back 28. When it is desired to test the cone brake no-back 28, a force is applied to the test pinion gear 90 to overcome the bias of the test spring 92 and move the test pinion gear 90 into mesh with the drive gear 86. The test power source 94 provides a torque to the drive gear 86 via the test pinion gear 90 to simulate a back-drive load and test the function of the cone brake no-back 28. In some embodiments, the test pinion gear 90 is operably connected to a test indicator 96, and actuation of the test indicator 96 via rotation of the pinion gear 90 confirms axial movement of the mechanism, and grounding of the input torque within a max pass at the test pinion 90 confirms limiting of the cone torque limiter 32.

The high gain braking function of the cone brake no-back 28 and the cone torque limiter 32 provided by the ball ramp mechanisms 46 and 68 reduces a space envelope and improves reliability of the actuator system 26 compared to traditional systems at least due to size and part count reduction. Utilizing the output no-back spring 56 and the input no-back spring 58 mitigates operational instability and chatter of the cone brake no-back 28. Further, use of the hollow torque shaft 40 reduces the space envelope of the actuator system 26.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A no back system, comprising:
a cone brake no-back;
a no-back input shaft operably connected to the cone brake no-back;
a no-back output shaft operably connected to the cone brake no-back; and
a cone torque limiter operably connected to the no-back output shaft, the cone torque limiter including:
a cone torque limiter reaction ball ramp rotatably driven by the no-back output shaft;
a torque limiter cone brake;

a cone torque limiter ball ramp mechanism disposed between the cone torque limiter reaction ball ramp and the torque limiter cone brake and engaged therewith; and a torque limiter reaction cone disposed such that when a surface jam or an overtorque load is applied via a drive gear the torque limiter cone brake engages the torque limiter reaction cone for transmission of the load to structural ground;

wherein the cone torque limiter reaction ball ramp is supported by a thrust bearing set.

2. The no-back system of claim 1, wherein the torque limiter cone brake is axially preloaded by a torque limiter preload spring.

3. The no-back system of claim 1, wherein the cone brake no-back includes:
an input no-back disk;
an output no-back disk;
a no-back ball ramp mechanism operably connected to the input no-back disk and the output no back disk;
an input no-back cone operably connected to and supportive of the input no-back disk, the input no-back cone axially loaded by an input no-back spring; and
an output no-back cone operably connected to and supportive of the output no-back disk, the output no-back cone axially loaded by an output no-back spring;
wherein the no-back input shaft is operably connected to the input no-back disk and the output no back disk; and
wherein the no-back output shaft is operably connected to the output no back disk.

4. The no-back system of claim 3, further comprising an input no-back disk lining applied to the input no-back disk and the input no-back cone.

5. The no-back system of claim 4, wherein the input no-back disk lining is formed from an aramid or composite material containing aramid.

6. The no-back system of claim 3, wherein the no-back output shaft is a hollow torque shaft.

7. The no-back system of claim 6, wherein the no-back input shaft is coaxial with and disposed radially inside of the no-back output shaft.

8. The no-back system of claim 3, wherein an axial travel of the input no-back cone due to the input no-back spring is limited by a mechanical stop.

9. The no-back system of claim 1, further comprising a no-back test mechanism coupled to an output drive gear of the no-back system, the no-back test mechanism including:
a test pinion gear selectably engagable with the output drive gear; and a test power source operably connected to the test pinion gear and configured to apply a back drive load to the cone brake no-back via the output drive gear when the test pinion gear is engaged with the output drive gear.

10. The no-back system of claim 9, further comprising a test spring to bias the test pinion gear out of engagement with the output drive gear.

11. A no-back system comprising:
a cone brake no-back driven by a no-back input shaft;
a cone torque limiter operably connected to the cone brake no-back via a no-back output shaft;
an output drive gear operably connected to the cone torque limiter;
a linear power screw operably connected to and driven by the output drive gear; and
a no-back test mechanism selectably engagable with the output drive gear to test the cone brake no-back.

12. The no-back system of claim 11, wherein the cone brake no-back includes:
an input no-back disk;
an output no-back disk;
a no-back ball ramp mechanism operably connected to the input no-back disk and the output no back disk;
an input no-back cone operably connected to and supportive of the input no-back disk, the input no-back cone axially loaded by an input no-back spring; and
an output no-back cone operably connected to and supportive of the output no-back disk, the output no-back cone axially loaded by an output no-back spring;
wherein the no-back input shaft is operably connected to the input no-back disk and the output no back disk; and
wherein the no-back output shaft is operably connected to the output no back disk.

13. The no-back system of claim 11, wherein the cone torque limiter includes:
a cone torque limiter reaction ball ramp rotatably driven by the no-back output shaft;
a torque limiter cone brake;
a cone torque limiter ball ramp mechanism disposed between the cone torque limiter reaction ball ramp and the torque limiter cone brake and engaged therewith; and
a torque limiter reaction cone disposed such that when a surface jam or an overtorque load is applied via the drive gear the torque limiter cone brake engages the torque limiter reaction cone for transmission of the load to structural ground.

* * * * *